Patented July 15, 1941

2,249,279

UNITED STATES PATENT OFFICE 2,249,279

METHOD OF MANUFACTURING ABRASIVE ARTICLES

Samuel S. Kistler, West Boylston, Mass., assignor to Norton Company, Worcester, Mass., a corporation of Massachusetts No Drawing. Application November 24, 1937, Serial No. 176,294

4 Claims. (Cl. 51—293)

The invention relates to abrasive articles comprising abrasive grain bonded with synthetic resin or resinoid, for example grinding wheels, abrasive blocks and bricks, lapping wheels, regulating wheels, honing sticks and like articles, and with regard to its specific features, to articles bonded with phenol-formaldehyde resin and resins made from phenol or any of its homologues with formaldehyde or any of its homologues.

One object of the invention is to provide a method of making a resinoid bonded grinding wheel or other abrasive body of dense structure. Another object of the invention is to provide an abrasive body consisting of abrasive grains bonded by an organic bond of extremely dense structure. Another object of the invention is to provide a grinding wheel of durable characteristics.

Another object of the invention is to provide a method of bonding grinding wheels with organic bond avoiding swelling. Another object of the invention is to accelerate the production of organic resinoid bonded grinding wheels and other abrasive bodies. Another object of the invention is to remove water formed or occurring during the maturing of resinoid bonded abrasive bodies. Another object of the invention is to secure improved adhesion between abrasive grain and resinoid bond.

Another object of the invention is to provide a more economical method for the manufacture of the articles indicated. Another object of the invention is to provide a method of manufacture whereby products of more diversified types of structure may be produced. Another object of the invention is to provide a method of manufacture of abrasive articles of the class indicated containing a greater percentage of resinoid bond than has hitherto been practicable. Another object of the invention is to provide a superior grinding wheel for many specific uses. Another object of the invention is to provide a more durable grinding wheel of the type indicated. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of abrasive grain. Any desired type of abrasive grain may be used, for example alumina in any of its forms, including fused alumina, emery and corundum, also silicon carbide and diamond. I may also use other hard carbides, such as those of boron, tungsten or tantalum. Within the limits of the invention, any grain size or mixture of grain sizes whatsoever may be employed.

So far as certain features are concerned, the invention is not limited to specific methods of plasticizing the mass or wetting the abrasive grain or forming a moldable mixture, but for completeness I will now give a typical example of the method and composition of the invention, specifically pointing out a preferred manner of introducing the ingredients.

Taking 83.3 parts by weight of alumina abrasive grain, I place this in a mixing pan. I set aside 9.46 parts of powdered phenol-formaldehyde resin, such as is known under the trade-mark "Bakelite." I set aside 6.61 parts of cryolite and .63 part of quick lime, CaO.

The foregoing will be seen to add up to 100 parts and, therefore, may be considered as percentages. Having placed the required amount of alumina abrasive grain in the mixing pan, I add furfural, which is a liquid, in an amount equal to 65 cc. per pound of powdered phenol-formaldehyde resin. This furfural is allowed to drip or flow into the pan while the pan is rotating and the mixing is continued until each grain is coated with a thin film of the liquid. I mix together the three above-mentioned ingredients which come in powdered form, that is to say the phenol-formaldehyde resin, the cryolite and the quick lime. After the mixing of the abrasive grain and furfural has proceeded to the point where each abrasive grain is coated with a film of the liquid, I introduce the mixture of the three mentioned powdered substances, either through a hopper or a screen or by means of a scoop or the like. In other words, the powdered substances may be dumped into the mixing pan and thereafter the mixing is continued for a desired length of time until the powder has been spread throughout the mass and is found adhering to each individual abrasive grain, being wet by the liquid thereon.

I now add, while the mixing pan is still in action, neutral creosote oil in the amount of 20 cc. per pound of phenol-formaldehyde resin. The mixing is continued until the creosote oil has been thoroughly distributed through the mass of ingredients in the pan.

As the foregoing is a specific example only, I note that the creosote oil might be omitted altogether. Furthermore, instead of furfural, I might use liquid phenol-formaldehyde resin or other liquid plasticizer. In the event that liquid phenol-formaldehyde resin is used, my total phenol-formaldehyde resin is still 9.46 parts, in the specific example given, of which 22½% of this total amount is liquid stage. The furfural or the liquid stage phenol-formaldehyde resin acts not only to form a part of the ultimate bond but also serves to plasticize the mass and enables me to achieve a coating of each abrasive grain with bond, and facilitates the distribution of the bond throughout the mass and permits the mixture to be cold molded.

Cryolite is a filler and I may use any other filler or omit the same altogether. In place of cryolite I might use a clay, quartz, calcium carbonate, calcium sulfate or many other minerals. I may make a dense wheel by selecting different sizes of the abrasive grain.

Having thus proceeded in any known or desired manner to produce a suitable mixture of abrasive grains and resinoid bond, I place, preferably a measured quantity thereof, in a suitable mold. I then apply pressure to the mold, desirably pressing to a predetermined volume, in order to produce an article which when cured is the final article, such as a grinding wheel or abrasive block or other desired shape.

I now remove the pressed article from the mold in the known manner. The article, for example the future grinding wheel, is now in what is called the "green" state, that is to say the pressure has changed the plastic mass into an object of form and shape which can be handled but which will possess much greater strength after it has been cured.

It has been customary to raise the temperature of heat curable synthetic resin abrasive products slowly to the maximum temperature. For example, it has been customary to use approximately fifty hours or in the neighborhood thereof to raise the temperature of phenol-formaldehyde products to the maximum, for example around 175° C., especially in the case of the larger articles, as otherwise the articles would be found to be swelled. I have found that the reason why swelling occurred in the past when it was attempted to cure too quickly and the reason why such a long period of time had to be employed in the manufacture of these products, is that they contain water and produce water by reaction as aforesaid and such water is converted into steam during the curing of the article which, as it occupies a vastly greater volume than the water, swells the article in attempting to escape.

This detrimental swelling, on the one hand, and the excessive length of time, on the other hand, I am enabled to avoid by using an autoclave (or other closed chamber) having a pressure of the order of the saturated steam pressure at the maximum temperature or substantially less than such temperature. I may cure articles up to even the moderately large sizes in the short space of time of one and a half hours using such pressure. But by reason of the fact that, when the maximum temperature is reached, the resin has already set to a certain extent, I may use a pressure considerably under the saturated steam pressure for the highest temperature. As a specific example, using a maximum temperature of 175° C., in the case of a phenol-formaldehyde resin with any of the abrasive grains, I may raise the temperature in one and a half hours on any average or usual temperature curve, and use a pressure of only 95 lbs. absolute to the square inch. At 175° C. the vapor pressure of the water is 129.4 lbs. absolute to the square inch but the resin is, when the product reaches this temperature, strong enough to hold the water as such with the pressure of 95 lbs. per square inch absolute. That is to say, the partially cured resin itself appears to resist an internal pressure of 34.4 lbs. to the square inch or probably more, as there is a certain factor of safety in the procedure indicated. In the specific example the temperature was raised by heating the autoclave to approximately 175° C. for the balance of the curing time. Under such conditions, with a wheel 2½ inches thick, the interior of the wheel reaches 160° C. in about one hour and a quarter.

The effect of applying pressure to the article as it is cured, which pressure is either the saturated steam pressure at the momentary temperature or so close thereto that the strength of the partially cured resin accounts for the difference, is, I believe, to prevent the water from passing into steam at all, or at least in only a relatively small or negligible quantity, thus preventing the detrimental swelling which would otherwise take place were it attempted to cure the article in the short space of time specified.

Not only am I enabled greatly to shorten the time involved in curing synthetic resin bonded abrasive articles by the method of the invention, but I am also enabled to make new and different products thereby. For example, the normal limit of bond in an article of the type described in actual practical commercial use has been in the neighborhood of 28% of bond by volume. With the method of the present invention, however, I may make an article of the type indicated with any amount of bond, by percentage. I am enabled to do this because, in such dense structures, I avoid swelling by positively preventing the formation of steam which cannot ordinarily escape without swelling or cracking a very dense structure having substantially more than 28% of resinoid.

Such dense abrasive wheels have particular utility in connection with the grinding of very tough materials, as for example stainless steel. Dense wheels made with more than 28% of bond may be made tougher and more durable, and non-porous. The so-called "grade hardness" of such wheels may be extremely high.

It should be understood that in the case of very heavy, large or thick articles, a length of time greater than one and one-half hours may be used. It takes some time for the heat to penetrate by conduction into the interior of the article. I may in some cases raise the temperature slightly above that which has heretofore been used for the same type of resin, thereby reducing the total amount of curing time, as swelling due to generation of steam is, according to the invention, prevented with the pressures employed, as indicated. In certain cases the time employed in curing the product may be even less than one and one-half hours, but I have achieved goods results in actual practice curing for an hour and a half at 95 lbs. per square inch absolute and at a temperature of 175° C., in the case of wheels 2½ inches thick, 16 inches in diameter, made from the mixture previously described.

If the article in a "green" state is introduced into an autoclave which is already at a temperature of approximately 175° C., there is nevertheless an appreciable time interval required to bring the article, especially a thick article, to a temperature at which the saturated steam pressure is 95 lbs. per square inch absolute, or approximately 80 lbs. gauge. This temperature is 162° C. and when the article or any part of it reaches this temperature, it has already been cured to some extent. With a pressure of 80 lbs. gauge, there is at this time a substantial balancing of pressures and, as the temperature rises, the curing proceeds and I have found in actual practice that a wheel of the size above indicated can be cured in this manner without detrimental swelling. I may use very much higher pressures than those indicated but, so far as I now know, with no added results.

The invention may be carried out with any type of autoclave or closed container which can be heated and subjected to pressure. A convenient way of heating an autoclave is to incorporate a steam plate therein. The pressure referred to is desirably air pressure but I am not limited thereto as pressure of any suitable gas or even liquid may be employed so far as this invention is concerned.

I have referred to the use of pressure, but it will be understood that a varying pressure may be used, if desired, and the maximum pressure may be exerted only when the maximum temperature is attained. However, for convenience, a constant pressure may be employed.

It will be understood that, on account of the strength in resisting the internal pressures possessed by the resin as it is cured, there are wide variations in the minimum pressure which may be successfully employed in carrying out the invention, especially as the time factor is varied. For example, a lesser pressure than that previously mentioned may be employed successfully if the curing time is substantially greater than one and one-half hours. In so much as the regular commercial practice has been to employ a curing time of the order of fifty hours or more, some of the advantages of the invention may be achieved, so far as economy and speed of production are concerned, using a curing time of, for example twenty hours. In such event the pressure may be substantially less than 80 lbs. gauge, and in fact under such conditions, assuming a gradual rise in the temperature of the product, a pressure of one atmosphere gauge will be sufficient to prevent swelling due to generation of steam. This is because the resin, when cured, possesses great strength to resist internal pressures. I have found, for example, that three minutes at 175° C. is sufficient to give the resin a strength to resist 130 lbs. per square inch internal pressure absolute.

According to the present invention, I absorb the water which is present in the resin and which is formed during the curing process by means of a dehydrating agent. The final product is stronger and subject to less change if the water is absorbed. Without the use of the dehydrating agent, which is the quick lime of the foregoing example, the water remains in the resin as included droplets or the like. Although by the use of the autoclave, I am enabled to form a grinding wheel or other abrasive product rapidly and economically, nevertheless I have observed that in the case of thick grinding wheels or other abrasive products, the included water causes a certain amount of deterioration over a period of time. The final product is very much improved by incorporating a dehydrating agent in the mixture. On the other hand, the use of the dehydrating agent alone does not achieve all the advantages that are attained by the use of the autoclave. For example, the absorption of water does not take place in the mixture rapidly enough to permit curing in the short time heretofore mentioned without the use of the autoclave. The use either of an autoclave, on the one hand, or a dehydrating agent, on the other hand, is an improvement over prior methods so far as specific structures and features are concerned. For example, the use of the dehydrating agent improves the quality of the final wheel regardless of how much time is spent in curing the wheel. On the other hand, the use of an autoclave alone achieves very excellent results in the curing of thin cut-off wheels which may thus rapidly be cured, the water passing off by evaporation into the atmosphere of the autoclave by reason of the fact that the wheels are so thin it can readily escape from the mixture. Furthermore, for certain uses and grinding operations, it may be an advantage to make a wheel more cheaply even if something in the way of quality is sacrificed.

To attain economy of manufacture with the achievement of the best quality, I use both the dehydrating agent and the autoclave, for the dehydrating agent ultimately removes or absorbs the water while the autoclave prevents it at any time from passing into steam while allowing the curing to be effected rapidly and, therefore, economically. In my prior copending application Serial No. 82,281 filed May 28, 1936, I have described and claimed the use of a dehydrating agent, while in my prior copending application Serial No. 90,952 filed July 16, 1936, I have described and claimed the use of an autoclave. In this present application I describe the use both of a dehydrating agent and an autoclave and claim them in combination since each of these features improves the action of the other one.

I may use other dehydrating agents besides quick lime or anhydrous calcium oxide. For example, I may use a partially dehydrated aluminum hydroxide, such as has been marketed under the name "Activated alumina." This substance has the property of taking up water rapidly. I may also use, for example, soluble anhydrite ($CaSO_4$).

Soluble anhydrite is preferably prepared by heating plaster of Paris to a temperature between 170° C. and 300° C. I may also use activated silica gel, which is silica gel dehydrated at a temperature below 500° C.

Each of these substances is an inert, neutral or non-acidic, inorganic, solid, granular substance having the property of reacting with or absorbing water at temperatures between normal temperature and 160° C., and particularly at a temperature above 100° C., at which the resinoid is converted to the infusible condition.

Rapid heating is desirable to gain good fusion of the Bakelite bond before it sets up. The presence of calcium oxide enables the heating rate to be greatly increased without the use of pressure, but if one wishes to complete the cure in three to four hours, detrimental swelling may occur unless pressure is used, excepting in the case of thin or cut-off wheels. Undoubtedly there is water vapor released during the rapid rise that is hindered mechanically from reacting immediately with the CaO and that can, therefore, produce swelling. If swelling is prevented by external pressure, the water is given time to diffuse through the structure and eventually react with the CaO.

As further examples of the practice of this invention, I give the following:

*Example II*

Seventy-six and thirty-nine hundredths pounds of fourteen mesh silicon carbide are wet with one and fifty-eight hundredths pounds of furfural. In a separate container eight and eighty-four hundredths pounds of powdered phenol-formaldehyde resin are mixed with eleven and forty hundredths pounds cryolite and one and seventy-nine hundredths pounds of powdered calcium oxide. This latter mixture is then poured onto the wet abrasive in a mixer and the mixing continued until all the grains are coated with the powder. A weighed quantity of this mix is placed in a suitable mold and cold pressed to a specific gravity of 2.51. The wheel is stripped from the mold, placed on a bat and heated in an autoclave under approximately eighty pounds per square inch gauge air pressure at such a rate that it is at 175° C. in one and one-half hours. The temperature is thereafter maintained constant for another one and one-half hours. The wheel is now finished and may be removed hot from the autoclave.

*Example III*

Eighty-two and eighty-four hundredths pounds of #12 mesh fused alumina grain are wet with two and seventy-two hundredths pounds of liquid phenol-formaldehyde resin. To this is added, as above, a mixture of nine and forty-five hundredths pounds powdered phenol-formaldehyde, four and eighteen hundredths pounds of cryolite and eighty-one hundredths pound CaO. The mix is pressed to a specific gravity of two and eighty-six hundredths and baked as above in the autoclave.

It will thus be seen that there has been provided by this invention a method in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. Method of making an abrasive body comprising abrasive grain bonded with a resin which is the polymerized product of phenol and its homologues with formaldehyde and its homologues which comprises adding to the mixture of the foregoing a quantity of non-acidic inorganic dehydrating agent capable of taking up water of reaction at a temperature substantially above 100° C., pressing the mixture, and curing the pressed product in an an autoclave at a temperature substantially above 100° C. under a pressure sufficient to prevent any water in the body from passing into steam, whereby swelling is avoided by preventing the generation of steam and water formed in the body is eventually taken up by the dehydrating agent.

2. Method of making an abrasive body comprising abrasive grain bonded with a resin which is the polymerized product of phenol and its homologues with formaldehyde and its homologues which comprises adding to the mixture of the foregoing a quantity of non-acidic inorganic dehydrating agent capable of taking up water of reaction at a temperature substantially above 100° C., pressing the mixture in a suitable mold, stripping from the mold, placing the pressed article in an autoclave, applying a substantial pressure above atmospheric pressure to prevent any water in the body from passing into steam, and raising to a temperature of above 150° C.

3. Method according to claim 1 in which the dehydrating agent is calcium oxide.

4. Method according to claim 2 in which the dehydrating agent is calcium oxide.

SAMUEL S. KISTLER.